US007659896B2

(12) United States Patent
Hoddie et al.

(10) Patent No.: US 7,659,896 B2
(45) Date of Patent: *Feb. 9, 2010

(54) METHOD AND APPARATUS FOR CHAINING TWO OR MORE TWEENS TO PROVIDE NON-LINEAR MULTIMEDIA EFFECTS

(75) Inventors: J. Peter Hoddie, Mountain View, CA (US); Sean Allen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/603,351

(22) Filed: Nov. 20, 2006

(65) Prior Publication Data

US 2007/0139417 A1    Jun. 21, 2007

Related U.S. Application Data

(63) Continuation of application No. 10/843,752, filed on May 11, 2004, now Pat. No. 7,139,001, which is a continuation of application No. 09/001,155, filed on Dec. 30, 1997, now abandoned.

(51) Int. Cl.
*G06T 15/70* (2006.01)

(52) U.S. Cl. .................. 345/473; 345/419; 345/474; 345/475; 345/629; 382/266; 382/190; 382/195

(58) Field of Classification Search .............. 345/473, 345/474, 475, 419, 629; 382/202, 209, 289, 382/266, 190, 195
See application file for complete search history.

(56) References Cited

U.S. PATENT DOCUMENTS

| 4,612,627 | A |   | 9/1986  | Sugita et al.            |
|-----------|---|---|---------|--------------------------|
| 5,224,177 | A | * | 6/1993  | Doi et al. ........ 382/168 |
| 5,353,391 | A |   | 10/1994 | Cohen et al.             |
| 5,359,712 | A |   | 10/1994 | Cohen et al.             |
| 5,384,912 | A | * | 1/1995  | Ogrinc et al. ..... 345/501 |
| 5,469,535 | A | * | 11/1995 | Jarvis et al. ..... 345/582 |
| 5,926,190 | A |   | 7/1999  | Turkowski et al.         |
| 6,034,667 | A | * | 3/2000  | Barrett ............ 345/603 |

* cited by examiner

*Primary Examiner*—Kimbinh T Nguyen
(74) *Attorney, Agent, or Firm*—Blakely, Sokoloff, Taylor & Zafman LLP (57) ABSTRACT

An improved method for generating non-linear multimedia effects by employing two or more tweens. Specifically, a second tween mapping is chained to a first tween mapping. A first time signal is received. The first tween is employed to map the first time signal into a second time signal. The second tween mapping is employed to map the second time signal into an output that varies in a non-linear fashion with respect to the first time signal.

19 Claims, 9 Drawing Sheets

| Time | Point | Tween |
|---|---|---|
| $t_1 = 0 \times L$ | A = | PathToPoint($t_1$) |
| $t_2 = (1/8) \times L$ | B = | PathToPoint($t_2$) |
| $t_3 = (2/8) \times L$ | C = | PathToPoint($t_3$) |
| $t_4 = (3/8) \times L$ | D = | PathToPoint($t_4$) |
| $t_5 = (4/8) \times L$ | E = | PathToPoint($t_5$) |
| $t_6 = (5/8) \times L$ | F = | PathToPoint($t_6$) |
| $t_7 = (6/8) \times L$ | G = | PathToPoint($t_7$) |
| $t_8 = (7/8) \times L$ | H = | PathToPoint($t_8$) |

METHOD AND APPARATUS FOR CHAINING TWO OR MORE TWEENS TO PROVIDE NON-LINEAR MULTIMEDIA EFFECTS

This application is a continuation of U.S. patent application Ser. No. 10/843,752, filed on May 11, 2004 now U.S. Pat. No. 7,139,001, which is a continuation of U.S. patent application Ser. No. 09/001,155, filed on Dec. 30, 1997 now abandoned.

BACKGROUND OF THE INVENTION

1. Field of the Invention

The present invention relates generally to the creation, integration, and publication of digital media and more particularly to an improved method to generate non-linear effects, such as acceleration of an object and the fading in and out of a volume level, by chaining two or more tweens.

2. Description of the Related Art

The assignee of the present invention has developed QuickTime™, an award-winning industry-standard software architecture that allows developers to create, integrate, and publish all types of digital media. As applications increase in sophistication, and consumers demand increased realism in multimedia products, developers are increasingly turning to generate non-linear effects to create added realism.

In addition, many human perceptions and senses, such as the auditory perception of sound and the visual perception of object motion (e.g., acceleration) can only be described mathematically as a non-linear function. Unfortunately, these non-linear mathematical functions are typically very difficult to describe, mathematically or otherwise. The versions of QuickTime™ up through release 2.5 do not allow a developer to specify a custom specific non-linear effect. For example, although a developer can use a predetermined fade-in or fade-out of a volume level, the QuickTime™ architecture does not allow developers to customize or specify other fade-in or fade-out relationships or functions besides the predetermined relationships, supported by the QuickTime™ architecture.

As a result, developers were left to one of two undesirable choices. The first choice is to attempt to describe a non-linear mapping by employing a mathematical function. However, as stated previously, many of the non-linear functions are difficult, if not impossible, to describe mathematically. The second choice is to employ a table that is, at best, an estimate of the non-linear performance or behavior of a particular parameter such as volume level or an object's speed. The second choice suffers from the disadvantage that the table typically approximates to a first order the mathematical function, but is not the same as the mathematical function. Accordingly, a loss of realism occurs. Moreover, different developers develop their own tables, resulting in non-uniformity in the industry. For example, different software products can describe non-linear effects, such as acceleration of an object or the fading in and out of a volume level in very different ways. Furthermore, because there is no consistent way to describe non-linear effects, developers cannot build enhancements to their existing models or other developer's models. Nor can developers share or port the models to others.

Accordingly, there remains a need in the industry for an improved method to provide multimedia non-linear effects that overcomes the disadvantages set forth previously.

SUMMARY OF THE INVENTION

An improved method for generating multimedia non-linear effects by chaining two or more tweens. The present invention can employ a second tween mapping that maps a first time signal into a second time signal, and a first tween mapping that maps the second time signal to an output value. The first tween is employed to map the first time signal into a second time signal in either a linear or non-linear fashion. The second tween mapping maps the second time signal into an output that varies in a linear or non-linear fashion with respect to the first time signal. Additional tweens can be chained to the first and second tween to provide other multimedia effects, such as moving an object forward and back across a path numerous times.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances, well known methods, procedures, components, and circuits have not been described in detail as not to unnecessarily obscure aspects of the present invention.

Some portions of the detailed description which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be noted, however, that all of these and similar terms are to be associated with the appropriate physical quantities and are merely convenient labels applied to these quantities. Unless specifically stated otherwise, it should be noted that throughout the description of the present invention, terms such as "processing" or "computing" or "calculating" or "determining" or "displaying" or the like, refer to the action and processes of a computer system, or similar electronic computing device, that manipulates and transforms data represented as physical (electronic) quantities within the computer system's register and memories into other data similarly represented as physical quantities within the computer system memories or registers or other such information storage, transmission or display devices.

The present invention also relates to an apparatus for performing the processing steps of the present invention. This apparatus may be specially constructed for the required purposes, or it may comprise a general purpose computer selectively activated or reconfigured by a computer program. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will become apparent from the description below. In addition, the present invention is not described with reference to any particular programming language. It will be appreciated that a variety of programming languages may be used to implement the teachings of the invention as described herein.

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams and flow charts. As to the flow charts, each block within the flow charts represents both a method step and an apparatus element for performing the method step. Depending upon the implementation, the corresponding apparatus element may be configured in hardware, software, firmware or combinations thereof.

Computer System

Figure 1:
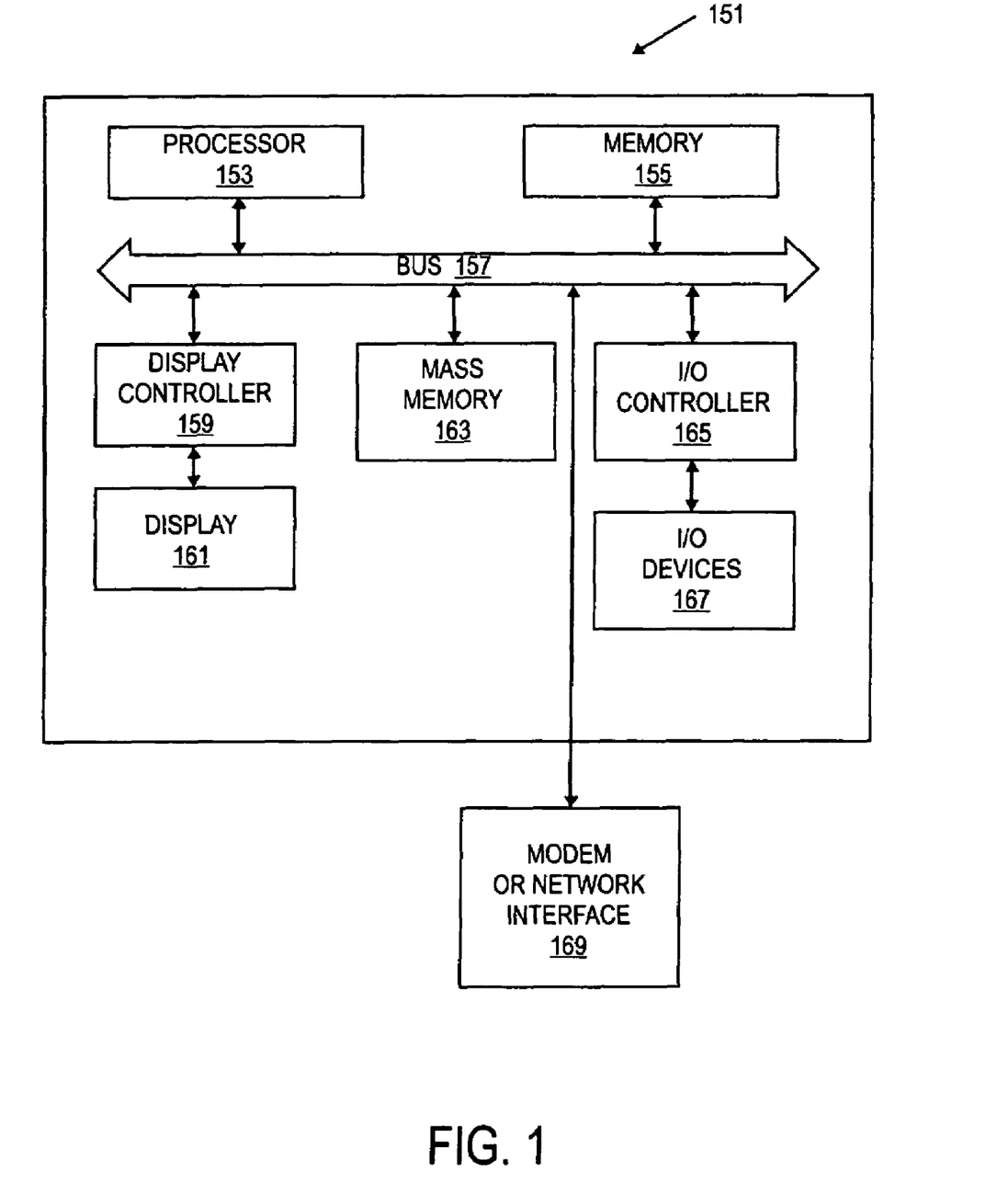
FIG. 1 shows one example of a conventional computer system in which the present invention can be implemented.

FIG. 1 shows one example of a conventional computer system 151 in which the present invention can be implemented. The computer system 151 interfaces to external systems through a modem or network interface 169. It will be appreciated that the modem or network interface 169 may be considered part of the computer system 151. This interface 169 may be an analog modem, an ISDN modem, a cable modem, a token ring interface, a satellite transmission interface (e.g., "Direct "PC"), or other interferences for coupling a digital processing system to other digital processing systems.

The computer system 151 includes a processor 153 which may be a conventional microprocessor, such as a Motorola PowerPC microprocessor or an Intel Pentium microprocessor. Memory 155 is coupled to the processor 153 by the bus 157. Memory 155 may be dynamic random access memory (DRAM) and may also include static RAM (SRAM). The bus 157 couples the processor 153 to the memory 155 and also to mass memory 163 and to display controller 159 and to the I/O (input/output) controller 165. Display controller 159 controls in the conventional manner a display on the display device 161 which may be a CRT or a liquid crystal display device. The input/output devices 169 may include a keyboard, disk drives, printers, a scanner, a digital camera, and other input and output devices, including a mouse or other pointing devices.

The display controller 159 and the I/O controller 165 may be implemented with conventional well known technology. The mass memory 163 is often a magnetic hard disk, an optical disk, or another form of storage for large amounts of data. Some of this data is often written, by a direct memory access process, into memory 155 during execution of software in the computer system 151.

It will be appreciated that the computer system 151 is one example of many possible computer systems which have different architectures. For example, Macintosh or Wintel systems often have multiple busses, one of which may be considered to be a peripheral bus. Network computers may also be considered to be a computer system which may be used with the present invention. Network computers may not include a hard disk or other mass storage, and the executable programs are loaded from a network connection into the memory 151 for execution by the processor 153. A Web TV system, which is known in the art, may be considered to be a computer system according to the present invention, but it may not include certain features shown in FIG. 1, such as certain input or output devices. A cell phone having a suitable display and a processor and memory may also be considered to be a digital processing system or a computer system which may be used with the present invention.

A typical computer system will usually include at least a processor, memory and a bus coupling the memory to the processor. It will also be appreciated that the computer system 151 is typically controlled by an operating system software which includes a file management system, such as a disk operating system, which is part of the operating system software.

Tween Definition

Tweens (also referred to herein as "tween mapping") are functions that generate an output value based upon an input, such as a percentage, and a relationship between the input and static data. This relationship can be described in a table which provides a mapping, or a mathematical function, which also provides a mapping. The Quicktime™ software architecture provides for tweens or tween-mappings.

Interpolation Tweens

One example of a tween is a Quicktime™ interpolation tween which receives the following inputs: 1) a starting number, 2) an ending number, and 3) input percentage. Based on these inputs, the tween mapping generates an interpolated number. In this case, the percentage specifies the distance from the starting number to the requested number divided by the distance between the start number and the end number. Path to X( ) and Path to Y( ) tweens are examples of non-linear interpolation tweens. The Path to X( ) and Path to Y( ) are described in greater detail in Appendix I.

A Quicktime™ interpolation tween can be employed, for example, to fade-in a volume level of a multimedia application, such as a sound track to a movie, over a certain duration of time.

QT Atom Tween

Another Quicktime™ tween can include a list of data items and can return a single item from the list based upon an input percentage. This type of tween can be used to generate a cycle of discrete numbers. These discrete numbers can be employed to direct a sprite as to which image to use to produce animation. Another type of Quicktime™ tween can store a path and return a location and tangent of a point along the path based upon an input percentage. This type of tween can be used to make a sprite follow and rotate along a path. The Quicktime™ software architecture employs tween mappings to produce resolution independent behavior in the time domain.

Chain of Tweens

The present invention allows a chain of tween mappings to operate upon a time value and to generate intermediate time values, where the final time value is provided to a root tween mapping that generates an output value based on the final time value. The present invention provides for the reuse of two or more existing Quicktime™ tween mappings (also referred to herein as "tweeners") in order to build new custom and more complex tweens. A developer can create new tweens to customize certain functions that manipulate time, which is ultimately provided to a root tween mapping. Accordingly, the present invention allows a user/developer to customize and reuse complex and preexisting tweens to generate additional tweens. It will be understood by those of ordinary skill in the art that many different permutations of change of tweens can be derived and developed.

Chain of Two Tweens

Figure 2:
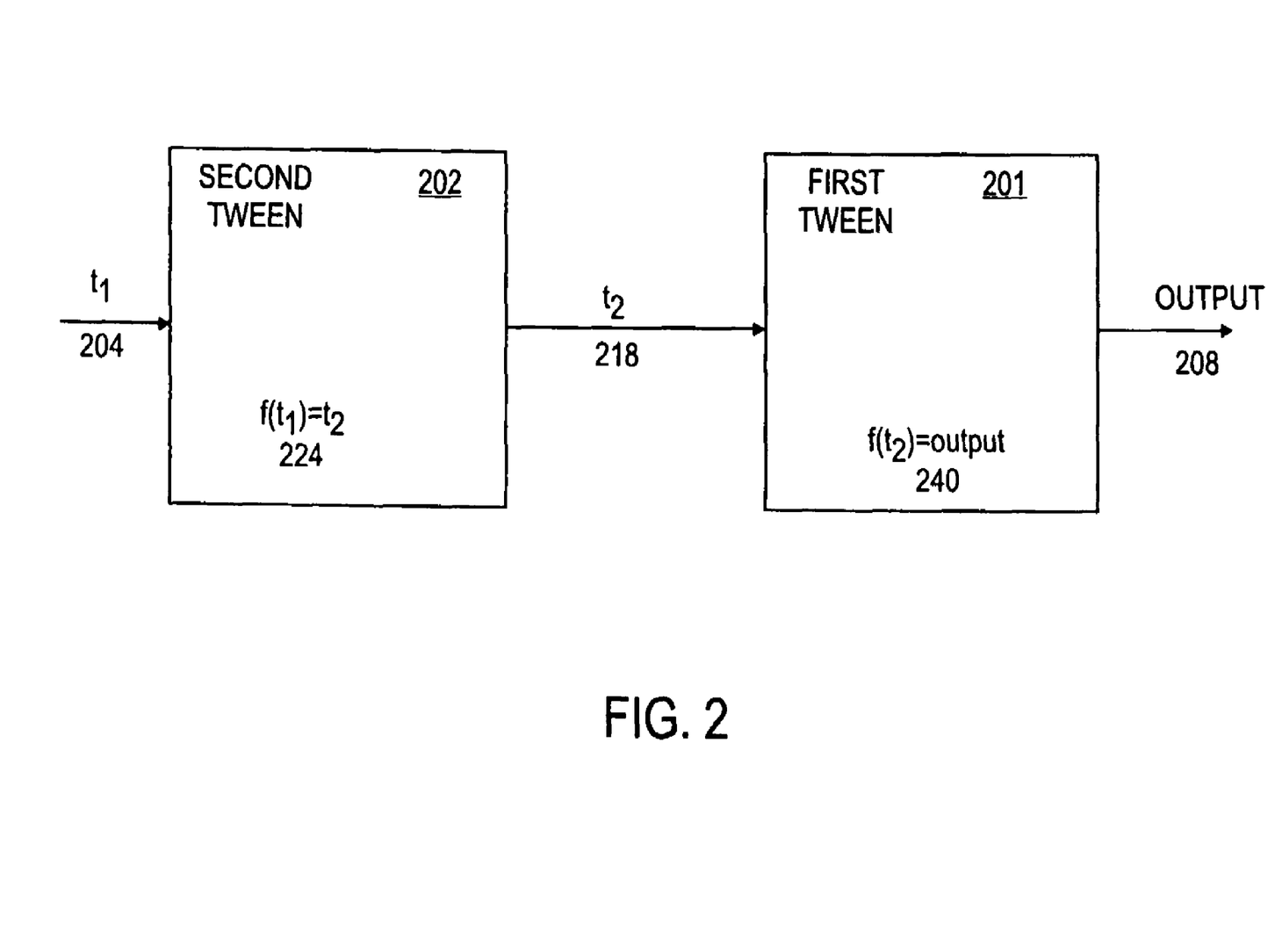
FIG. 2 shows an example of a computer readable storage medium incorporating one embodiment of the present invention in which two tweens are chained or linked.

FIG. 2 shows an example of a computer readable storage medium incorporating one embodiment of the present invention in which two tweens are chained or linked. The present invention 200 provides a novel method of providing non-linear effects to multimedia by the chaining together of multiple tweens. Specifically, FIG. 2 illustrates the chaining together of a first tween 201 and a second tween 202. A first time value ($t_1$) 204 is provided to the second tween 202. In response, the second tween 202 generates a second time value ($t_2$) 218 in accordance to a particular relationship 224. For example, the relationship 224 can be represented by the following: $f(t_1)=t_2$. This relationship 224 can vary and be adapted and tailored to a particular application.

A first tween 201 receives the second time value ($t_2$) 218 and responsive thereto, generates an output value 208. The relationship 240 between the second time value ($t_2$) 218 and the output value 208 can be represented by the following expression:

$$f(t_2)=\text{output}$$

This relationship 240 can be varied, adapted and tailored to suit a particular application. Appendix I illustrates several tweens that are provided in Quicktime™ Version 3.0 that are especially adapted to be the second tween 202. The second tween 202, or intermediary tween, is also referred to herein as an "interpolator tween" that provides an output, which is in turn used as a time input to another tween that is chained to the interpolator tween.

Example of Effects Created by Present Invention

Figure 3:
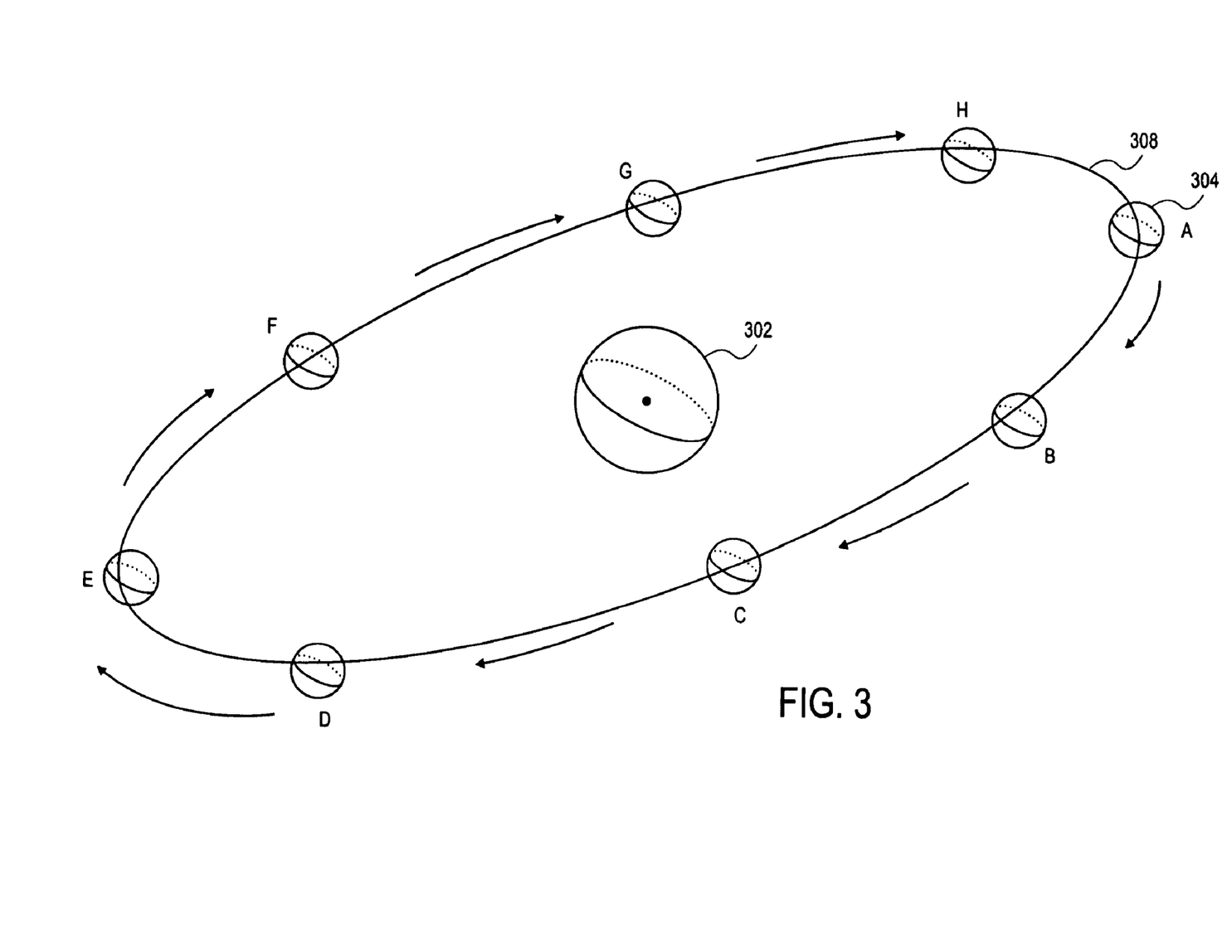
FIG. 3 illustrates an exemplary multimedia application of a planet orbiting a sun in which the present invention can be employed to provide non-linear effects.

FIG. 3 illustrates a planet 304 orbiting a sun 302. The present invention can be employed to provide acceleration effects of planet 304 as it orbits around the sun 302 in the predetermined orbit path 308.

Figure 4:
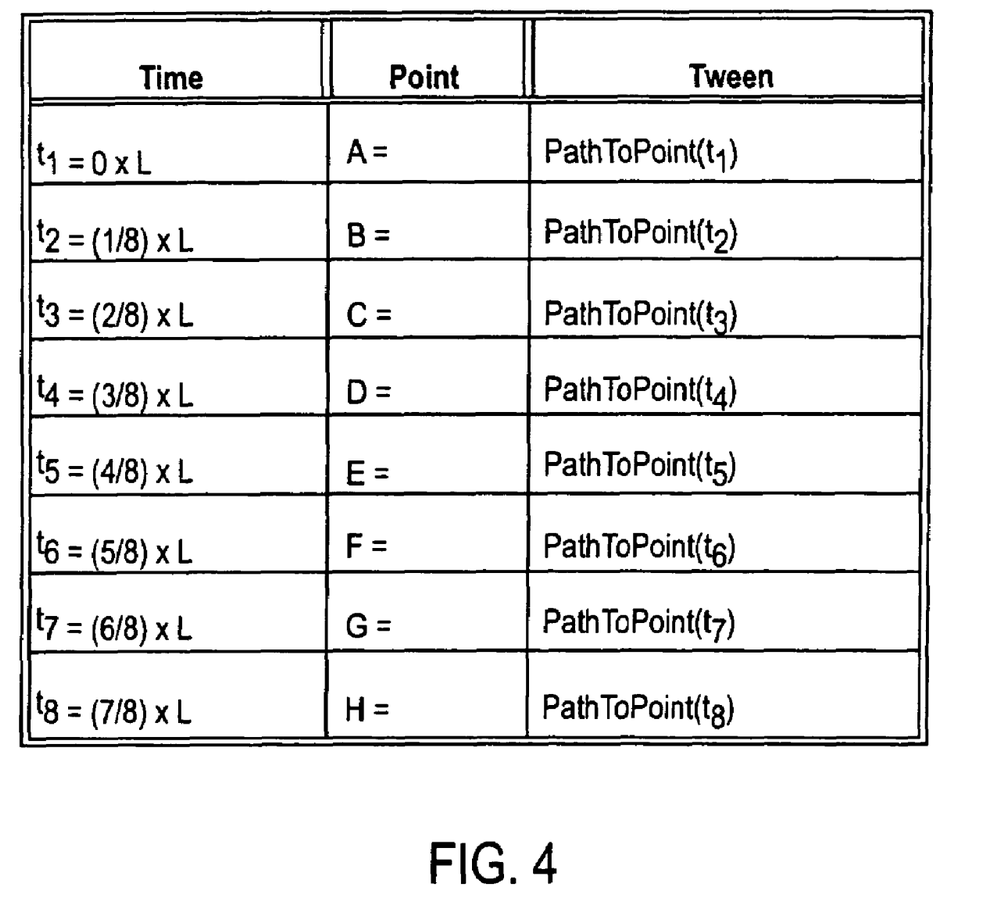
FIG. 4 illustrates a path-to-point tween that defines the path for the planet of FIG. 3.

FIG. 4 illustrates a path-to-point tween (i.e., PathToPoint( )) described by Table I. Table I assumes that the orbit path 308 has a total length (L) when measured from starting point A and ending at point A. Further, points A, B, C, D, E, F, G, and H are assumed to be evenly distributed across the path (i.e., that is the distance between each point is the same and is given by the length (L) divided by 8).

TABLE I

| Time | Point | Tween |
|---|---|---|
| $t_1=0\times L$ | A = | PathToPoint($t_1$) |
| $t_2=(1/8)\times L$ | B = | PathToPoint($t_2$) |
| $t_3=(2/8)\times L$ | C = | PathToPoint($t_3$) |
| $t_4=(3/8)\times L$ | D = | PathToPoint($t_4$) |
| $t_5=(4/8)\times L$ | E = | PathToPoint($t_5$) |
| $t_6=(5/8)\times L$ | F = | PathToPoint($t_6$) |
| $t_7=(6/8)\times L$ | G = | PathToPoint($t_7$) |
| $t_8=(7/8)\times L$ | H = | PathToPoint($t_8$) |

Figure 5:
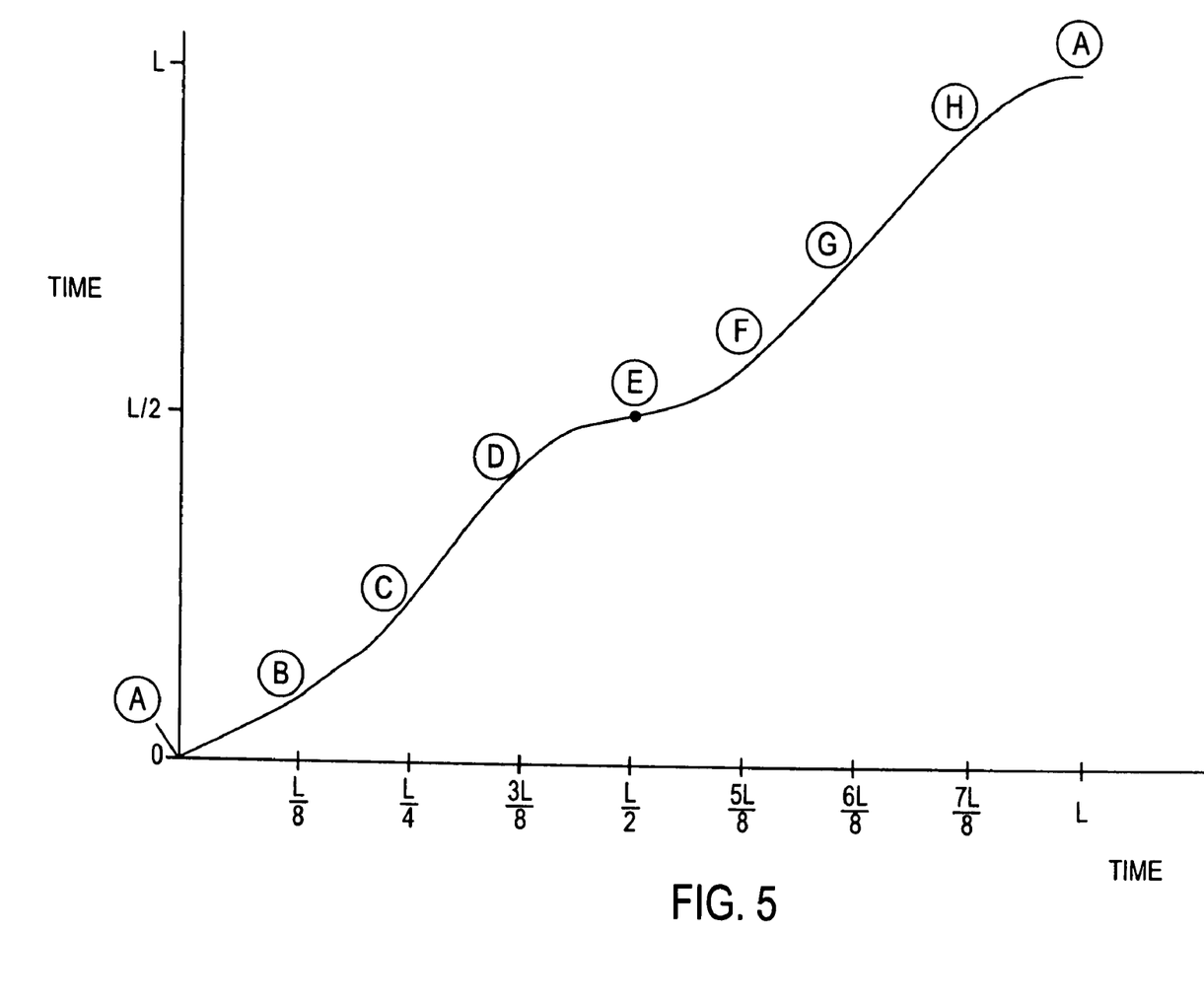
FIG. 5 illustrates a time versus time interpolation curve, which when employed in conjunction with the tween described in FIG. 4, provides non-linear multimedia effects to the planet.

FIG. 5 illustrates a time versus time interpolation curve which when employed in conjunction with the tween of FIG. 4 provides multimedia effects (e.g., acceleration) to the planet 304.

Figure 6:
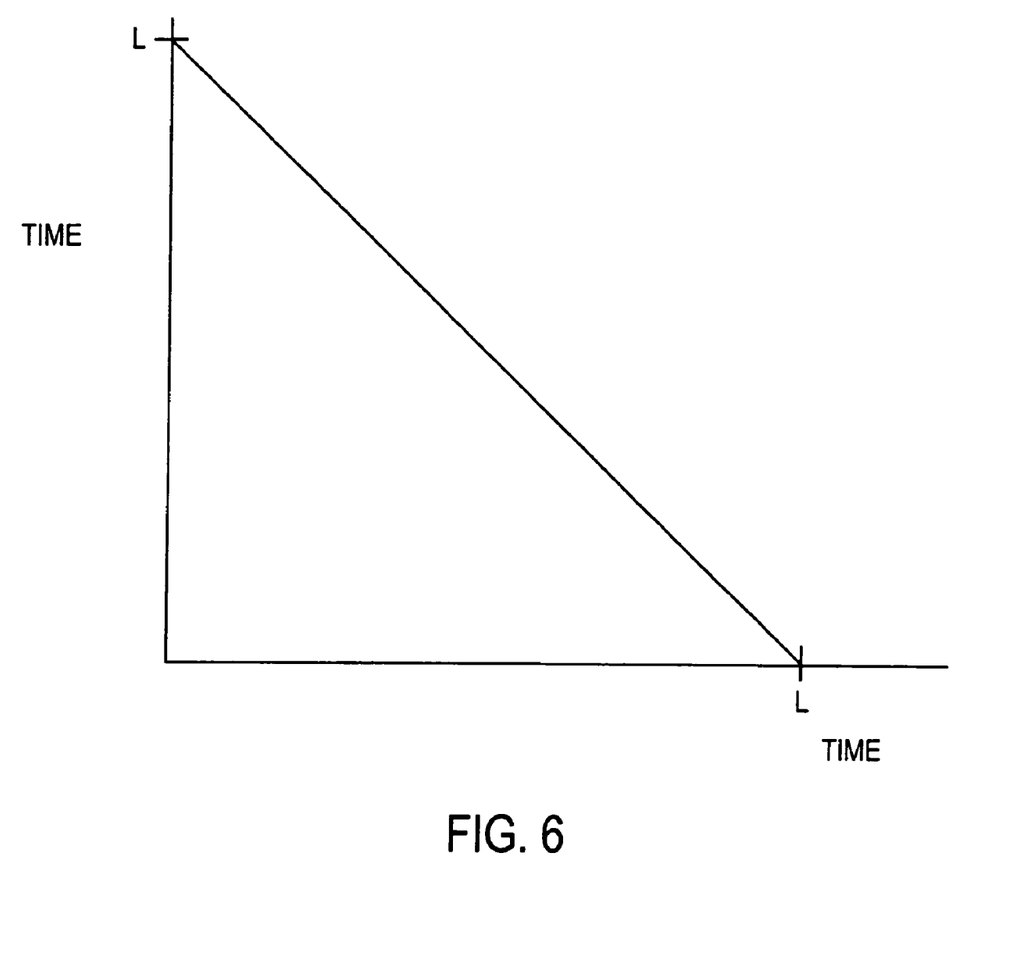
FIG. 6 illustrates a time versus time interpolation curve which when employed in conjunction with the tween described in FIG. 4 and the tween described in FIG. 5 provide for counterclockwise movement of the planet around the sun.
Figure 7:
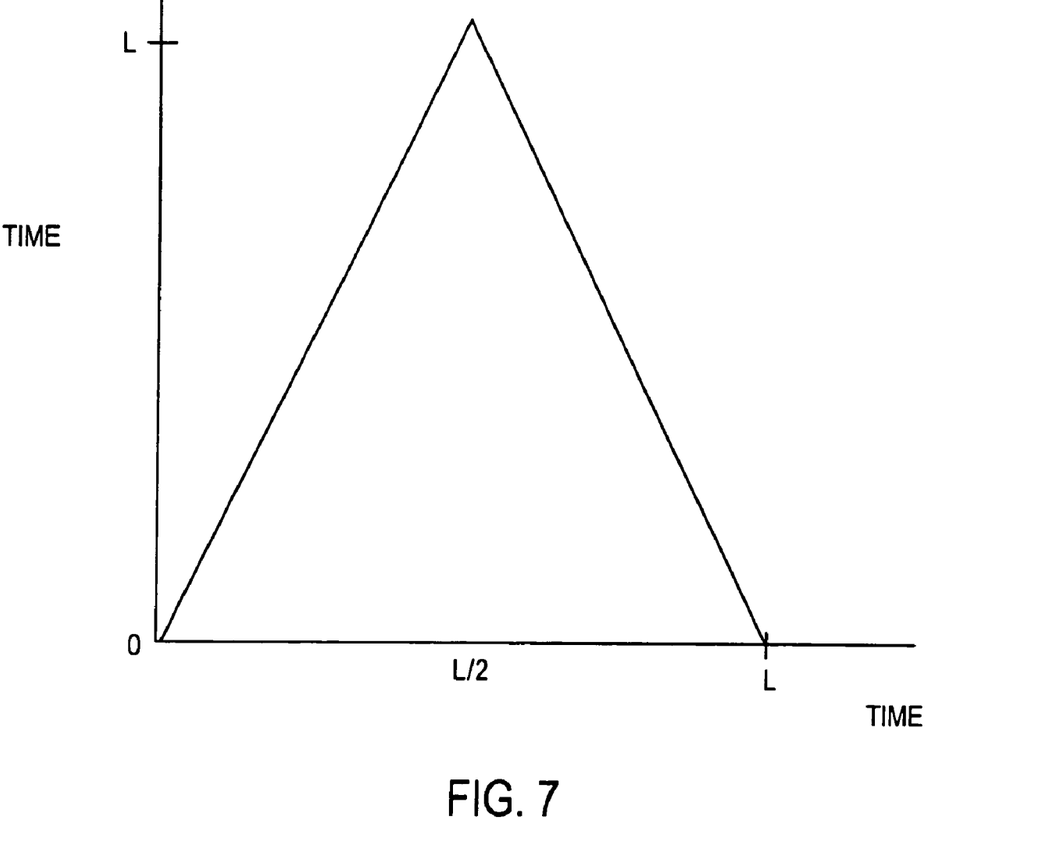
FIG. 7 illustrates a time versus time interpolation curve which when employed in conjunction with the tween, described in FIG. 4, and the tween, described in FIG. 5, provide for clockwise full orbit at double speed and then counterclockwise full orbit at double speed.

FIGS. 6 and 7 illustrate how a third tween can be chained with a first and second tween to form a chain of three tweens.

FIG. 6 illustrates a time versus time interpolation curve which when employed in conjunction with (i.e., "chained") the tween described in FIG. 4 and the tween described in FIG. 5 provide for counterclockwise movement of the planet around the sun.

FIG. 7 illustrates a time versus time interpolation curve which when employed in conjunction with (i.e., "chained") the tween described in FIG. 4 and the tween described in FIG. 5 provide for clockwise full orbit at double speed and then counterclockwise full orbit at double speed.

Chain of Three Tweens

Figure 8:
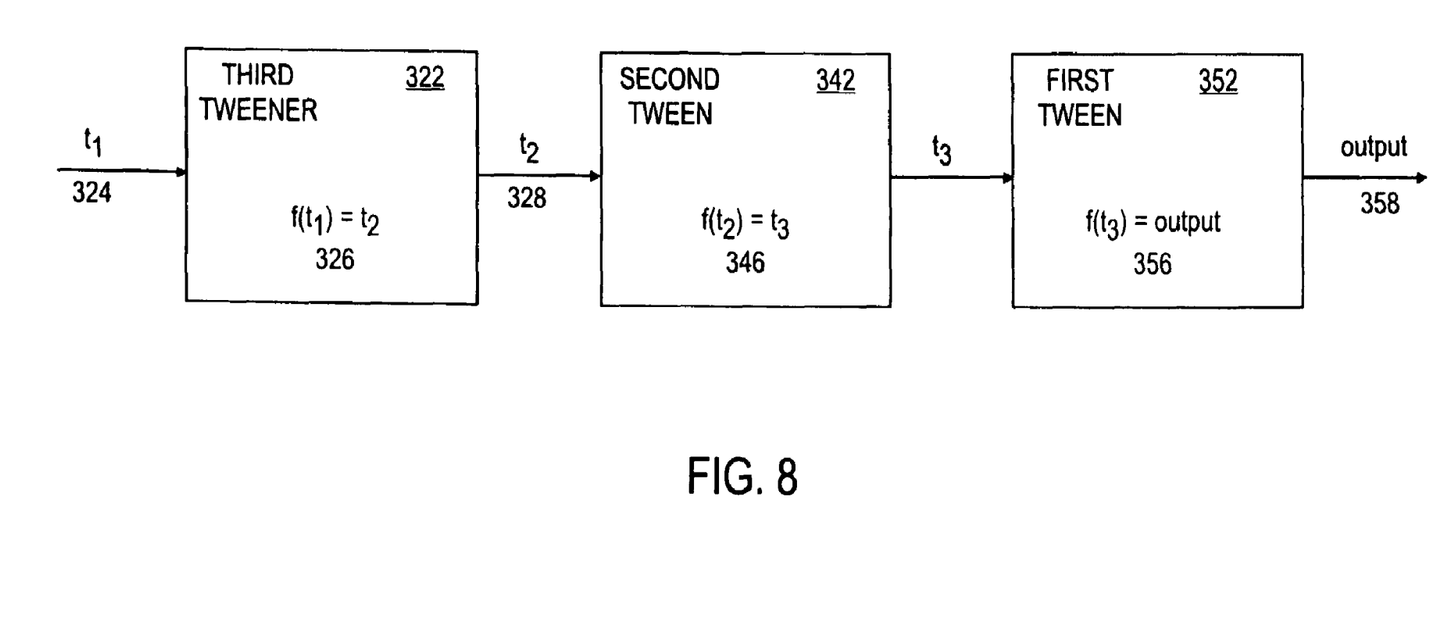
FIG. 8 shows an example of a computer readable storage medium incorporating an alternative embodiment of the present invention, in which three tweens are chained or linked.

FIG. 8 shows an example of a computer readable storage medium incorporating an alternative embodiment of the present invention, in which three tweens are chained or linked. In this embodiment, three tweens are chained together to provide further non-linear multimedia effects. A third tween 322 includes an input for receiving a first time value ($t_1$) 324, and responsive thereto, for generating a second time value ($t_2$) 328. The relationship 326 between the first time value ($t_1$) 324 and the second time value ($t_2$) 328 can be described by the following:

$$f(t_1)=t_2.$$

A second tween 342 is coupled to receive the second time value ($t_2$) 328, and responsive thereto, generates a third time value ($t_3$) 348. The relationship 346 between the second time value ($t_2$) 328 and the third time value ($t_3$) 348 can be described by the following:

$$f(t_2)=t_3.$$

A first tween 352 is coupled to receive the third time value ($t_3$) 348, and responsive thereto, generates an output 358 based on a relationship 356. This relationship 356 can be described as follows:

$$f(t_3)=\text{output}.$$

Chain of N Tween

Figure 9:
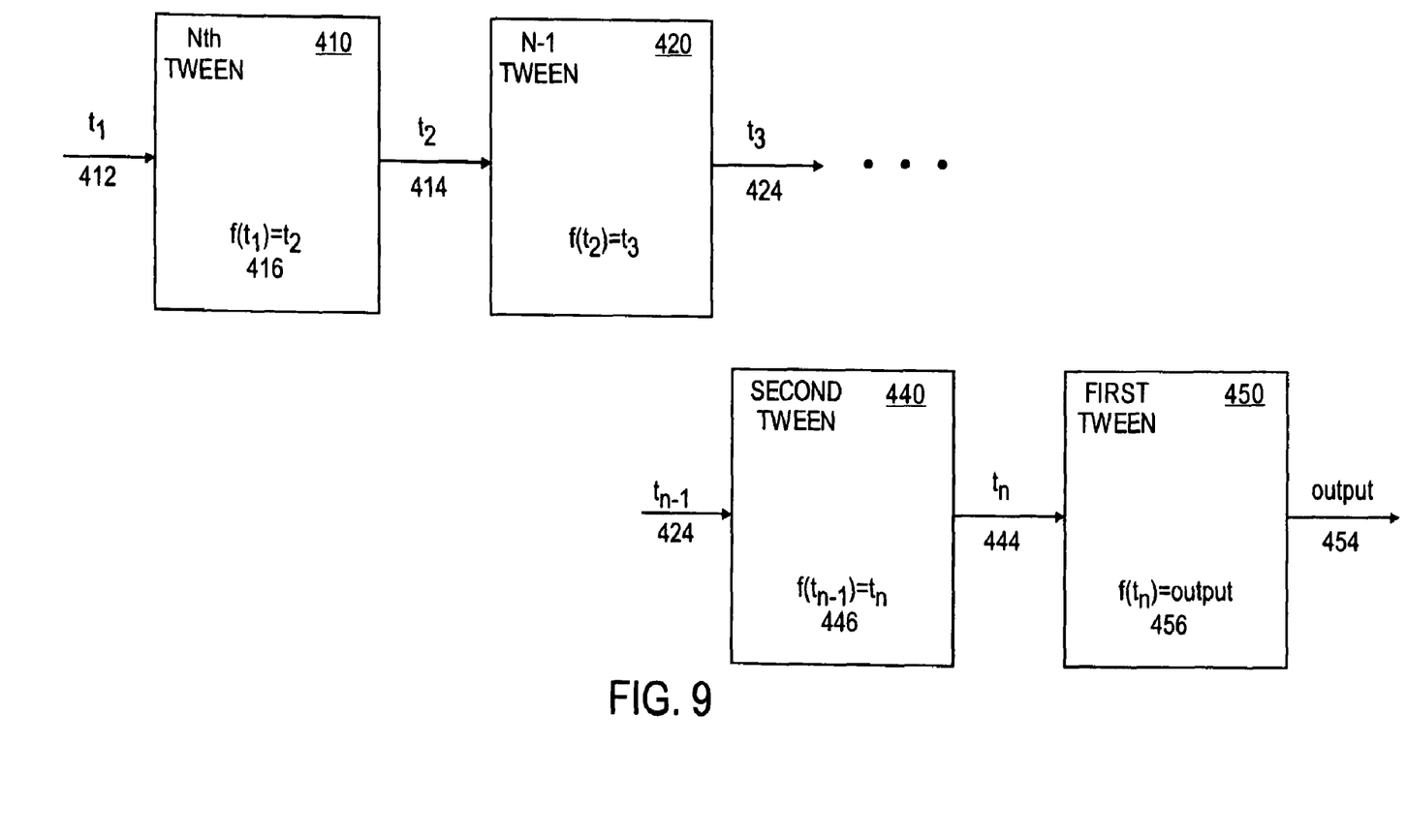
FIG. 9 shows an example of a computer readable storage medium incorporating yet another embodiment of the present invention, in which n tweens are chained or linked so as to form a chain of n tweens.

FIG. 9 shows an example of a computer readable storage medium incorporating of yet another embodiment of the present invention, in which n tweens are chained or linked so as to form a chain of n tweens. In this embodiment, an nth tween 410 is coupled to receive a time value (t) 412 and, in response thereto, generates a second time value ($t_2$) 414 based on a relationship 416 (e.g., $f(t_1)=t_2$). An n-1 tween 420 is linked to the n tween 410 and is coupled to receive the second time value ($t_2$) 414. Responsive thereto, the n-1 tween 420 generates a third time value ($t_3$) 424 based on the relationship 426 (e.g., $f(t_1)=t_3$). A second tween 440 is provided to receive a t(n−1) value 442, and in response thereto, to generate $t_n$ value 444 based upon a relationship 446 (e.g., $f(t_{n-1})=t_n$). A first tween 450 is coupled to receive the $t_n$ value 444 and in response thereto, to generate an output 454, based on a relationship 456 (e.g., $f(t_n)$=output).

When the tweens described in FIGS. 4 and 5 are chained or linked in accordance with the present invention, a multimedia acceleration effect is provided for an object, in this case, a planet. Before the introduction of the present invention, the speed of the object orbiting the planet is constant. FIG. 5 illustrates a second tween, which maps linear time to a non linear time causing the velocity of the orbiting object to go from a constant one to one with acceleration. The acceleration models the real world acceleration of an orbiting planet. FIG. 6 is a third tween mapping that causes the planet to orbit backwards, which in this example would be counterclockwise instead of clockwise. As can be seen from this example, the present invention provides the flexible use of multiple tween mappings to allow a developer to describe non-linear effects with ease and precision.

In the foregoing specification, the invention has been described with reference to specific exemplary embodiments thereof. It will however be evident that various modifications and changes made be made thereto without departing from the broader spirit and scope of the invention as set forth in the appended claims. The specification and drawings are accordingly to be regarded as illustrative rather than restrictive.

Appendix I

QuickTime 3.0 adds several new tweener types and also extends the format of the tween container to enable more complex tweens to be built for all tweener types.

The new tweeners are the QTAtomList Tweener, the Polygon Tweener, the MultiMatrix Tweener, the Spin Tweener, and several flavors of Path Tweeners.

The QTAtomList Tweener returns an element from a list containing any type of data elements. This tweener differs from most in that the only thing that is calculated is which element to return, not the value of the data returned.

The Polygon Tweener returns a MatrixRecord which can map a Sprite or a Track1s shape into a four sided polygon. The polygon is tweened between a starting and ending polygon.

The MultiMatrix Tweener returns a MatrixRecord which can be applied to a Sprite or a Track. The matrix returned is the result of concatenating together the results of several tweeners which return matrices.

The Spin Tweener returns a MatrixRecord which can be applied to a Sprite or a Track. The matrix returned will cause a rotation based on a given number of rotations over the duration of the tween.

The Path Tweeners fall into two categories. The first returns a point and/or the tangent of a point along a path given a distance along the path. One type returns the point as a FixedPoint and the other as a MatrixRecord with the point as it1s offset, and possible with the tangent as it1s rotation. The second type of PathTweener treats the path as a function. Given an x value it will return the corresponding y value, or visa versa, the result in both cases being a Fixed. The path tweeners also may be configured to return a delta from the last time it was called.

The tween container format has been extended to support two new types of functionality, sequenced tweens and interpolated tweens.

Sequenced tweens allow a sequence of tweens of the same tween type to be described. Each element in the sequence has it1s own percentage of the duration of the total tween duration. For example a single RGBColor tween can now describe tweening from red to yellow, and then yellow to blue by containing a two element sequence.

Interpolated tweens allow a tween to reference another tween as it1s interpolator. This allows acceleration curves to be applied to a tween. The input time value is first fed to the interpolation tween whose result is then fed into the regular tween. The tween result of an interpolation tween must therefore be a four byte quantity since it will be used as the TimeValue fed to the regular tween.

Tween Container Format

The 3QTAtomContainer Descriptions2 document contains a key which describes the following syntax.

```
[(TweenContainerFormat)] =
{
    [(SingleTweenFormat)]
}
OR
{
    [(SequencedTweenFormat)]
}
[(SingleTweenFormat)] =
[(TweenEntryAtoms)]
<kTweenEntry>, (anyUniqueIDs), (1..numInterpolators)
[(TweenEntryAtoms)]
[(SequencedTweenFormat)] =
kTweenSequenceElement, (anyUniqueIDs), (1..numSequenceElements)
[TweenSequenceEntryRecord] = {endPercent, tweenAtomID, dataAtomID}
kTweenEntry, (anyUniqueIDs),
(1..numSequenceElements + numInterpolators)
[(TweenEntryAtoms)]
[(TweenEntryAtoms)] =
kTweenType, 1, 1
[OSType] = the type of tween
<kTweenStartOffset>, 1, 1
[TimeValue] = starting offset
<kTweenDuration>, 1, 1
[TimeValue] = duration
<kTweenOutputMinValue>, 1, 1
[Fixed] = minimum output value
<kTweenOutputMaxValue>, 1, 1
[Fixed] = maximum output value
<kTweenFlags>, 1, 1
[long] = flags
kTweenData, (anyUniqueIDs), (1..numDataAtoms)
contents dependent on kTweenType, could be leaf data or nested atoms
<kTweenInterpolationID>, (a kTweenData ID),
(1.. numInterpolationIDAtoms)
[QTAtomID] = the id of a kTweenEntry (child
of [(TweenContainerFormat)] describing the tween to be used to
interpolate time values.
```

Description of New Atom Types

Note that all of these new tween container atom types are optional.

kTweenSequenceElement

You may add one atom of this type for each element in a sequenced tween. The id1s may be any unique id1s. The sequence is ordered by index. The leaf data is a structure of type TweenSequenceEntryRecord. This structure describes the percentage of the total tween duration that the element takes using the endPercent field. The startPercent is implied by all of the previous elements endPercent1s added together. The structure also describes how to reinitialize the tween for this element by telling which tweenAtomID and dataAtomID to use. The tweenAtom is a child atom of the kTweenEntry atom, and the dataAtom is a child atom of the tweenAtom.

kTweenInterpolationID

You may add one atom of this type for each kTweenData atom which you want to have interpolated. Thus the id of this atom must match the id of the corresponding kTweenData atom. The index of the atom isn't used. The leaf data is a QTAtomID. This interpolatorAtomID describes which tween to use as the interpolator. The interpolatorAtom is a child atom of the kTweenEntry atom. Note that a dataAtom of ID 1 is assumed for an interpolator tween.

kTweenOutputMaxValue

You may add an atom of this type if you wish to describe the maximum output value of the tween. This value is only used if the tween is being used as an interpolator. In this case it is needed so the range of the interpolator tweens output can be mapped into the input range (the duration) of another tween. If you construct a tween container so that these ranges match, and you never change the duration, then you don't need this atom and the extra range mapping operation will be avoided.

kTweenOutputMinValue

You may add an atom of this type if you wish to describe the minimum output value of the tween. This value is only used if the tween is being used as an interpolator. The default minimum value is zero if this atom is not present. If an atom of type kTweenOutputMaxValue is not present, then this atom will be ignored since there is no default maximum value and the range cannot be determined.

kTweenFlags

You may add an atom of this type if you wish to modify the behavior of a tween. Currently only the PathTweens use this atom, and the only value defined is kTweenReturnDelta.

QTAtomListTweener Component

The AtomListTweener returns an element from a list depending on the current time value. The list may contain any number of elements, and the elements may be of any data size and type. A type 1 atom tells the AtomListTweener what the QTAtomType of the list elements is. This allows you to place extra child atoms of other types in the kTweenData atom which will be ignored by the AtomListTweener. The atoms in the list are ordered by index, the atom id's are ignored.

An example use of the AtomListTweener would be to store a list of image ID's which correspond to a sequence of animation cells.

Each element in the list is given equal time. Suppose for example you initialized an AtomListTweener with a duration of 100 and ten elements in it's list. Time values passed to the DoTween from 0 to 10 would return the data from the first element, values from 11 to 20 would return the second element etc.

```
Component SubType
   kTweenTypeAtomList
Tween Container Description
[(QTAtomListTweenEntryAtoms)] =
   kTweenType, 1, 1
      [kTweenTypeAtomList]
   kTweenData, 1, 1
      kTweenType, 1, 1
         [QTAtomType for elements in list, for example pcid1]
      pcid1, anyUniqueID, 1
         [data for first element]
      pcid1, anyUniqueID, 2
```

-continued

```
         [data for second element]
         ...
      pcid1, anyUniqueID, n
         [data for nth element]
   <kTweenStartOffset>, 1, 1
      [TimeValue] = starting offset
   <kTweenDuration>, 1, 1
      [TimeValue] = duration
   <kTweenOutputMinValue>, 1, 1
      [Fixed] = minimum output value
   <kTweenOutputMaxValue>, 1, 1
      [Fixed] = maximum output value
   <kTweenSequenceElement>, (anyUniqueIDs),
      (1..numElementsInSequence)
   [TweenSequenceEntryRecord]
      <kTweenInterpolationID>, (a kTweenData ID),
      (1..numInterpolationIDAtoms)
   [QTAtomID] = the id of a kTweenEntry (child of
   [(TweenContainerFormat)] describing the tween to be used to
   interpolate time values.
```

PolygonTweener Component

The PolygonTweener returns a MatrixRecord that can map the bounds of a Sprite or Track into a four sided polygon. The polygon changes based on the current time value. The data for the tweener consists of three polygons: the Sprite or Track's normal source dimensions, and the starting and ending polygons for the tween. An example use of the PolygonTweener would be to apply perspective effects to Sprite over time.

```
Component SubType
   kTweenTypePolygon
Tween Container Description
[(PolygonTweenEntryAtoms)] =
   kTweenType, 1, 1
      [kTweenTypePolygon]
   kTweenData, 1, 1
      Fixed[27]
```

An array of 27 Fixed values. The values are used to describe three polygons. Each polygon takes nine array elements to describe. The first element is actually a long instead of a Fixed, it contains the number of points to follow which should set to four. The next eight elements describe the four points in x, y value pairs. The first polygon is used to describe the normal source dimensions. For a sprite this would be (0,0), (spriteWidth, 0), (spriteWidth, spriteHeight), (0, spriteHeight). The second polygon describes the starting shape for the tween. This for example could be the trapezoid which is in the middle of the Sprite's Track. The third polygon is the ending shape for the tween.

```
The first polygon describes
   <kTweenStartOffset>, 1, 1
      [TimeValue] = starting offset
   <kTweenDuration>, 1, 1
      [TimeValue] = duration
   <kTweenSequenceElement>, (anyUniqueIDs),
      (1..numElementsInSequence)
   [TweenSequenceEntryRecord]
      <kTweenInterpolationID>, (a kTweenData ID),
      (1.. numInterpolationIDAtoms)
   [QTAtomID] = the id of a kTweenEntry (child of
   [(TweenContainerFormat)] describing
   the tween to be used to interpolate time values.
```

MultiMatrixTweener Component

The MultiMatrixTweener returns a MatrixRecord that can be applied to a Sprite or Track. The resulting matrix is actually a concatenation of several matrix tweeners. The data for the tweener consists of a list of kTweenEntry atoms each containing [(QTAtomListEntryAtoms)] for any type of tweener which returns a matrix. An example use of the MultiMatrixTweener would be to make a sprite follow a path using the PathTweener and at the same time apply a distortion effect using the PolygonTweener.

The order of matrix concatenation is important, the matrices are applied in order by index of the kTweenEntry child atoms of the MultiMatrixTweener1s data atom.

---

Component SubType
   kTweenTypeMultiMatrix
Tween Container Description
[(MultiMatrixTweenEntryAtoms)] =
   kTweenType, 1, 1
      [kTweenTypeMultiMatrix]
   kTweenData, 1, 1
      kTweenEntry, (anyUniqueIDs), (1..numMatrixTweeners)
         [(MatrixTweenEntryAtoms)]
      The [(MatrixTweenEntryAtoms)] can be tween entry atoms for any tweener type which returns a MatrixRecord such as kTweenTypePathToMatrixTranslationAndRotation,
      kTweenTypePathToMatrixTranslation, and kTweenTypePolygon.
   <kTweenStartOffset>, 1, 1
[TimeValue] = starting offset
<kTweenDuration>, 1, 1
[TimeValue] = duration
<kTweenSequenceElement>, (anyUniqueIDs),
(1..numElementsInSequence)
[TweenSequenceEntryRecord]
<kTweenInterpolationID>, (a kTweenData ID),
(1.. numInterpolationIDAtoms)
[QTAtomID] = the id of a kTweenEntry (child of
[(TweenContainerFormat)] describing the tween to be used to
interpolate time values.

---

SpinTweener Component

The SpinTweener returns a MatrixRecord that can be applied to a Sprite or Track. The resulting matrix contains a rotation. The data for the tweener consists an array of two Fixed numbers. The first Fixed number is the intialRotation value. This value is specified as a fraction of one rotation. A number between 0 and 1 is expected. A value of 0.25 would represent a rotation of 90 degrees. The second Fixed number is the number of rotations that should occur over the duration of the tween. If you want to spin a sprite four and a half times then this number should be 4.5.

---

Component SubType
   kTweenTypeSpin
Tween Container Description
[SpinTweenEntryAtoms)] =
   kTweenType, 1, 1
      [kTweenTypeSpin]
   kTweenData, 1, 1
      Fixed[2]

---

The data is an array of two Fixed numbers. The first Fixed number is the intialRotation value. The second Fixed number is the number of rotations that should occur over the duration of the tween.

---

<kTweenStartOffset>, 1, 1
[TimeValue] = starting offset
<kTweenDuration>, 1, 1
[TimeValue] = duration
<kTweenSequenceElement>, (anyUniqueIDs),
(1..numElementsInSequence)
[TweenSequenceEntryRecord]
<kTweenInterpolationID>, (a kTweenData ID),
(1.. numInterpolationIDAtoms)
[QTAtomID] = the id of a kTweenEntry (child
of [(TweenContainerFormat)] describing
the tween to be used to interpolate time values.

---

PathTweener Components

Five types of Path Tween Components are available. Three of them return a location along a path given a percentage of the path1s length. The other two consider the path a function of x or y and return the result of the function evaluated at a percentage of the range of the function.

All five Path Tween Components share the same data format. The path data format is the one used by the QuickTime Vector Codec. The QuickTime Vector Codec supplies routines for creating paths of this type. Note also that a transcoder exists which will convert an existing QuickDraw GX shape into this format.

The Path Tween Components only look at the first contour of the first path in the VectorCodec data stream. All other atom types and paths are allowed, but ignored.

An example use of a kTweenTypePathToFixedPoint or kTweenTypePathToMatrixTranslation PathTween Component is to make a sprite follow a curved path. The kTweenTypePathToMatrixTranslationAndRotation may additionally rotate the sprite to the tangent of the point along the path.

An example use of a kTweenTypePathXtoY or kTweenTypePathYtoX Path Tween Component is as an interpolation tweener, allowing an arbitrary acceleration curve to be applied to another tweener. Note that you usually want to add kTweenOutputMin and kTweenOutputMax atoms when when using any tweener as an interpolator.

Component Subtypes kTweenTypePathToFixedPoint

Given a percentage of the path1s length, a point along the path is determined. The Tween Result is a FixedPoint.

kTweenTypePathToMatrixRotation

Given a percentage of the path1s length, a point along the path is determined. The tangent of the point is used to determine a rotation value. The Tween Result is a MatrixRecord with a rotation value. You may use the optional InitialRotationAtom to add an initial rotation value. The value is a fraction of a rotation so to specify 180 degrees you would use 0.5.

kTweenTypePathToMatrixTranslation

Given a percentage of the path1s length, a point along the path is determined. The Tween Result is a MatrixRecord with x and y offsets corresponding to the point.

kTweenTypePathToMatrixTranslationAndRotation

Given a percentage of the path1s length, a point along the path is determined. Additionally the tangent of the point is used to determine a rotation value. The Tween Result is a MatrixRecord with x and y offsets corresponding to the point and the rotation calculated from the tangent. You may use the optional kInitialRotationAtom to add an initial rotation value. The value is a fraction of a rotation so to specify 180 degrees you would use 0.5.

kTweenTypePathXtoY

The path is considered a first order function of x. The range of the function is (last point1s x value-first point1s x value). Given a percentage of this range, the value of the function for that x is returned. In other words, the percentage is mapped to an x value, and the intersecting y value is determined. The Tween Result is a Fixed.

kTweenTypePathYtoX

The path is considered a first order function of y. The range of the function is (last point1s y value-first point1s y value). Given a percentage of this range, the value of the function for that y is returned. In other words, the percentage is mapped to a y value, and the intersecting x value is determined. The Tween Result is a Fixed.

```
Tween Container Description
[(PathTweenEntryAtoms)] =
    kTweenType, 1, 1
[one of the four path tween component sub types]
    <kInitialRotationAtom>, 1, 1
[Fixed]
    kTweenData, 1, 1
[QuickTime Vector Codec Data Stream]
<kTweenStartOffset>, 1, 1
[TimeValue] = starting offset
<kTweenDuration>, 1, 1
[TimeValue] = duration
<kTweenOutputMinValue>, 1, 1
[Fixed] = minimum output value
<kTweenOutputMaxValue>, 1, 1
[Fixed] = maximum output value
<kTweenFlags>, 1, 1
[long] = flags
<kTweenSequenceElement>, (anyUniqueIDs), (1..numElementsInSequence)
[TweenSequenceEntryRecord]
<kTweenInterpolationID>, (a kTweenData ID), (1.. numInterpolationIDAtoms)
[QTAtomID] = the id of a kTweenEntry (child of [(TweenContainerFormat)] describing
the tween to be used to interpolate time values.
Data Structures and Constants
struct TweenSequenceEntryRecord {
    Fixed           endPercent;
    QTAtomID        tweenAtomID;
    QTAtomID        dataAtomID;
};
typedef struct TweenSequenceEntryRecord TweenSequenceEntryRecord;
/* kTweenFlags*/
enum {
    kTweenReturnDelta       = 1L << 0
};
enum {
    kTweenEntry             = FOUR_CHAR_CODE('twen'),
    kTweenData              = FOUR_CHAR_CODE('data'),
    kTweenType              = FOUR_CHAR_CODE('twnt'),
    kTweenStartOffset       = FOUR_CHAR_CODE('twst'),
    kTweenDuration          = FOUR_CHAR_CODE('twdu'),
    kTweenFlags             = FOUR_CHAR_CODE('flag'),
    kTweenOutputMin         = FOUR_CHAR_CODE('omin'),
    kTweenOutputMax         = FOUR_CHAR_CODE('omax'),
    kTweenSequenceElement   = FOUR_CHAR_CODE('seqe'),
    kTween3dInitialCondition = FOUR_CHAR_CODE('icnd'),
    kTweenInterpolationID   = FOUR_CHAR_CODE('intr'),
    kTweenRegionData        = FOUR_CHAR_CODE('qdrg'),
    kTweenPictureData       = FOUR_CHAR_CODE('PICT'),
    kListElementType        = FOUR_CHAR_CODE('type'),
    kNameAtom               = FOUR_CHAR_CODE('name'),
    kMatrixAtom             = FOUR_CHAR_CODE('matr')
};
enum {
    kTweenTypeShort                     = 1,
    kTweenTypeLong                      = 2,
    kTweenTypeFixed                     = 3,
    kTweenTypePoint                     = 4,
    kTweenTypeQDRect                    = 5,
    kTweenTypeQDRegion                  = 6,
    kTweenTypeMatrix                    = 7,
    kTweenTypeRGBColor                  = 8,
    kTweenTypeGraphicsModeWithRGBColor  = 9,
    kTweenTypeQTFloatSingle             = 10,
    kTweenTypeQTFloatDouble             = 11,
    kTweenType3dScale                   = FOUR_CHAR_CODE('3sca'),
```

-continued

```
kTweenType3dTranslate                       = FOUR_CHAR_CODE('3tra'),
kTweenType3dRotate                          = FOUR_CHAR_CODE('3rot'),
kTweenType3dRotateAboutPoint                = FOUR_CHAR_CODE('3rap'),
kTweenType3dRotateAboutAxis                 = FOUR_CHAR_CODE('3rax'),
kTweenType3dQuaternion                      = FOUR_CHAR_CODE('3qua'),
kTweenType3dMatrix                          = FOUR_CHAR_CODE('3mat'),
kTweenType3dCameraData                      = FOUR_CHAR_CODE('3cam'),
kTweenType3dSoundLocalizationData           = FOUR_CHAR_CODE('3slc'),
kTweenTypePathToMatrixTranslation           = FOUR_CHAR_CODE('gxmt'),
kTweenTypePathToMatrixRotation              = FOUR_CHAR_CODE('gxpr'),
kTweenTypePathToMatrixTranslationAndRotation = FOUR_CHAR_CODE('gxmr'),
kTweenTypePathToFixedPoint                  = FOUR_CHAR_CODE('gxfp'),
kTweenTypePathXtoY                          = FOUR_CHAR_CODE('gxxy'),
kTweenTypePathYtoX                          = FOUR_CHAR_CODE('gxyx'),
kTweenTypeAtomList                          = FOUR_CHAR_CODE('atom'),
kTweenTypePolygon                           = FOUR_CHAR_CODE('poly'),
kTweenTypeMultiMatrix                       = FOUR_CHAR_CODE('mulm'),
kTweenTypeSpin                              = FOUR_CHAR_CODE('spin')
};
```

QTAtomContainer Based Data Structure Descriptions

QTAtomContainer based data structures are being widely used in QuickTime. This document is an attempt at standardizing how the format of these data structure may be described and documented. The Key presented here is used by the QT 3.0 Tween Documentation.

| QTAtomContainer Description Key |
|---|
| [(QTAtomFormatName)] = |
| atomType_1, id, index |
| data |
| atomType_n, id, index |
| data |

The atoms may be required or optional:

| | |
|---|---|
| <atomType> | optional atom |
| atomType | required atom |

The atom id may be a number if it is required to be a constant, or may be a list of valid atom id's, indicating that multiple atoms of this type are allowed.

| | |
|---|---|
| 3 | one atom with id of 3 |
| (1 ... 3) | three atoms with id's of 1, 2, and 3 |
| (1, 5, 7) | three atoms with id's of 1, 5, and 7 |
| (anyUniqueIDs) | multiple atoms each with a unique id |

The atom index may be a 1 if only one atom of this type is allowed, or it may be a range from one to some constant or variable.

| | |
|---|---|
| 1 | one atom of this type is allowed, index is always 1 |
| (1 ... 3) | three atoms with indecies 1, 2, and 3 |
| (1 ... numAtoms) | numAtoms atoms with indecies of 1 to numAtoms |

The data may be leaf data in which it's data type is listed inside of brackets [ ], or may be a nested tree of atoms

| | |
|---|---|
| [theDataType] | leaf data of type theDataType |
| childAtoms | a nested tree of atoms |

Nested QTAtom Format Definitions [(AtomFormatName)] may appear in a definition.

What is claimed is:

1. A machine-implemented method comprising:
   generating a multi-media effect by performing the following by executing program code with a computer system:
   receiving a first time signal at a first function;
   generating, by the first function, a second time signal from the first time signal using a first tabular mapping;
   receiving the second time signal at a second function;
   generating by the second function an output from the second time signal using a second tabular mapping, wherein the output varies non-linearly relative to the first time signal; and,
   rendering the output as a non-linearly varying human perceptible sight and/or sound.

2. The machine-implemented method of claim 1, wherein at least one of the first and second mappings is non-linear.

3. The machine-implemented method of claim 1, wherein the first function and the second function comprise functions for digital media software.

4. The machine-implemented method of claim 1, wherein the first mapping is different from the second mapping.

5. The machine-implemented method of claim 1, wherein the first mapping is a non-linear mapping of the first time signal to the second time signal, and the second mapping is a mapping describing varying color.

6. The machine-implemented method of claim 1, wherein the output is formatted for display.

7. The machine-implemented method of claim 1, further comprising
   receiving a third time signal at a third function that has a third mapping; and
   generating the first time signal from the third time signal using the third mapping.

8. The machine-implemented method of claim 1, wherein the first function and the second function describe color.

9. A computer readable storage medium containing executable computer program instructions which, when executed by a digital processing system, cause the digital processing system to perform a method comprising:

generating a multi-media effect by:

receiving a first time signal at a first function;

generating, by the first function, a second time signal from the first time signal using a first tabular mapping;

receiving the second time signal at a second function;

generating by the second function an output from the second time signal using a second tabular mapping, wherein the output varies non-linearly relative to the first time signal; and,    rendering the output as a non-linearly varying human perceptible sight and/or sound.

10. The machine-implemented method of claim 9, wherein at least one of the first and second mappings is non-linear.

11. The computer readable medium of claim 9, wherein the first mapping is a non-linear mapping of the first time signal to the second time signal, and the second mapping is a mapping describing varying color.

12. The computer readable medium of claim 9, wherein the output is formatted for display.

13. The computer readable medium of claim 9, wherein the method further comprises    receiving a third time signal at a third function; and    generating the first time signal, by the third function, from the third time signal using a third mapping.

14. The computer readable medium of claim 9, wherein the first function and the second function describe color.

15. A machine-implemented method for adjusting an output for a display, comprising:

receiving a first signal at a first function;

employing, by the first function, a first tabular mapping to map the first signal to a second signal;

receiving, at a second function, the second signal;

employing, by the second function, a second tabular mapping for mapping the second signal to the output, the second function being the same as the first function; and    rendering the output as colors on a display. , 16. The machine-implemented method of claim 15, wherein the adjustment includes adjusting from a first color to a second color.

17. A computer readable storage medium containing executable computer program instructions which, when executed by a digital processing system, cause the digital processing system to perform a method for adjusting an output for a display, comprising:

receiving a first signal at a first function;

employing, by the first function, a first tabular mapping to map the first signal to a second signal;

receiving, at a second function, the second signal; and, employing, by the second function, a second tabular mapping for mapping the second signal to the output, the second function being the same as the first function; and,    rendering the output as colors on a display.

18. The computer readable medium of claim 17, wherein the adjustment includes adjusting from a first color to a second color.

19. A digital processing system, comprising:

means for receiving a first time signal at a first function that provides a first tabular mapping;

means for generating, by the first function, a second time signal from the first time signal using the first tabular mapping;

means for receiving the second time signal at a second function that provides a second tabular mapping; and,    means for generating by the second function an output from the second time signal using the second tabular mapping, wherein the output varies non-linearly relative to the first time signal;

means for rendering the output in human perceptible form.

\* \* \* \* \*